Feb. 19, 1952 W. J. GRUEN 2,585,930

SYNCHRONIZING SYSTEM

Filed Sept. 28, 1949

Inventor:
Wolf J. Gruen,
by Merton D. Moore
His Attorney.

Patented Feb. 19, 1952 2,585,930

UNITED STATES PATENT OFFICE 2,585,930

SYNCHRONIZING SYSTEM

Wolf J. Gruen, Syracuse, N. Y., assignor to General Electric Company, a corporation of New York Application September 28, 1949, Serial No. 118,334

8 Claims. (Cl. 178—69.5)

Figure 1:
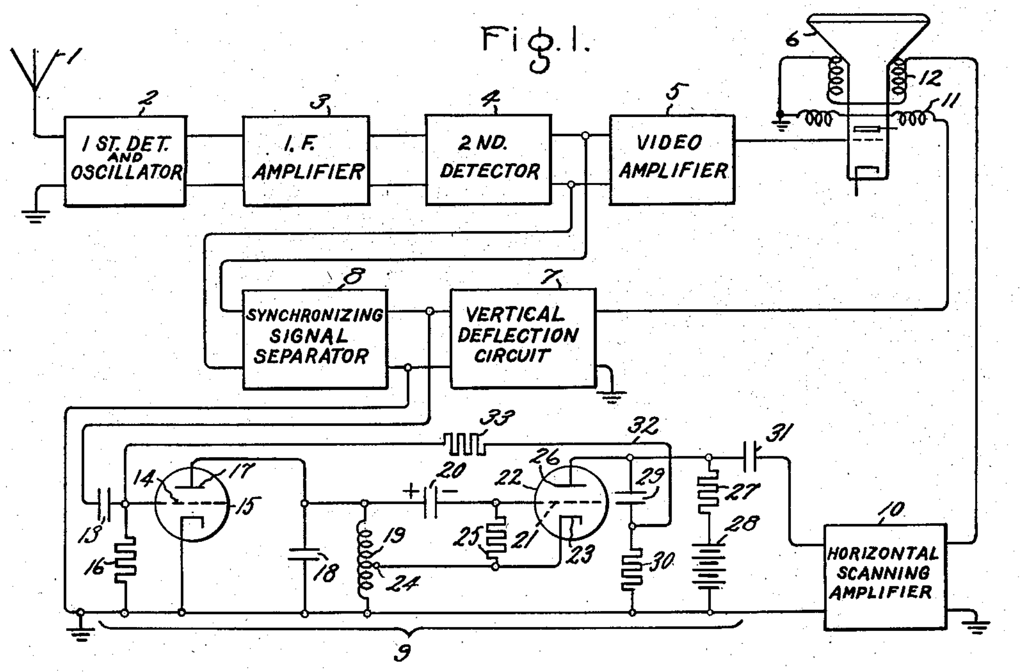

My invention relates to synchronizing systems, and, more particularly, to oscillator synchronizing systems which utilize a synchronizing signal consisting of periodically recurring pulses which may be contaminated by spurious and undesired noise voltages. While my invention is of general utility, it is particularly adapted for use in the scanning circuits, especially the line frequency scanning circuit, of a television receiver.

In certain instances, it is necessary to synchronize an oscillator with an external source of synchronizing pulses. Such a requirement is found in television receivers, wherein synchronizing pulses, produced at the transmitter and used to modulate the television carrier during the sweep retrace intervals, are separated from the composite television signal at the receiver and used to synchronize the horizontal and vertical scanning oscillators of the receiver. Certain arrangements heretofore proposed have applied the separated synchronizing pulses directly to the control electrode of the scanning oscillator. This direct type of synchronization is affected by spurious noise pulses which may be interspersed with the synchronizing pulses and cause random triggering of the scanning oscillator.

To increase noise rejection during synchronization, certain arrangements have utilized a phase detector circuit which controls the scanning oscillator. In these systems locally generated pulses are combined with the incoming synchronizing pulses to derive a phase responsive wave form. The derived wave form is applied to an integration circuit having a long time constant so that noise impulses which may be present in the synchronizing signal are averaged over a substantial number of cycles and the unidirectional control voltage obtained therefrom is used to control the frequency of the scanning oscillator.

Certain other arrangements have been proposed wherein the synchronized oscillator is maintained in phase with the synchronizing pulses by injecting the synchronizing pulses into the tank circuit of the oscillator. In these arrangements the synchronizing pulses supply sufficient reactive power to the tank circuit to cause the oscillator to oscillate at the desired frequency of the synchronizing pulses. Due to the selectivity of the resonant tank circuit and the so-called flywheel action thereof, substantial noise rejection, as compared to direct synchronization, is achieved by such a circuit. Such flywheel type synchronized oscillator systems, for example, are described and claimed in my copending applications Serial No. 95,538, filed on May 26, 1949, and Serial No. 98,347, filed on June 10, 1949, and assigned to the same assignee as my present invention.

In the synchronized oscillators disclosed in my above-mentioned applications, the amount of energy introduced into the tank circuit by the synchronizing pulses has a substantially fixed value. I have found that considerably better synchronizing action and discrimination against noise is obtained in such synchronized oscillators if the amount of energy injected into the tank circuit is made to vary in accordance with the phase relationship of the synchronizing pulses and the scanning oscillator. Accordingly, it is a primary object of my invention to provide a new and improved synchronized oscillator circuit of the flywheel type.

It is a further object of my invention to provide a new and improved synchronized oscillator circuit of the flywheel type in which improved noise rejection is obtained.

It is another object of my invention to provide a new and improved synchronized oscillator circuit of the flywheel type in which the amount of energy injected into the tank circuit of the oscillator is made to vary in accordance with the phase relationship of the synchronizing pulses and the oscillator.

It is still another object of my invention to provide a new and improved synchronized oscillator system in which phase responsive pulses are derived by comparison of received synchronizing pulses and locally produced oscillator pulses, the fundamental frequency energy content of the phase responsive pulses being utilized to synchronize the scanning oscillator.

Briefly, according to one phase of my invention, there is provided a scanning oscillator having a resonant tank circuit associated therewith. Synchronizing pulses and pulses obtained from the scanning oscillator are combined to obtain derived pulses whose energy content is dependent upon the relative phase relationship of the synchronizing pulses and the oscillator pulses. The derived pulses are injected into the tank circuit of the scanning oscillator by any suitable means so as to synchronize the oscillator. In a particular embodiment, an electron discharge device is connected across the tank circuit, the shunting effect of the electron discharge device being controlled by the derived pulses so as to inject into the tank circuit a variable amount of reactive power depending upon the phase relation of the synchronizing pulses and the oscillator pulses.

Figures 2A, 2B, 2C, 3:
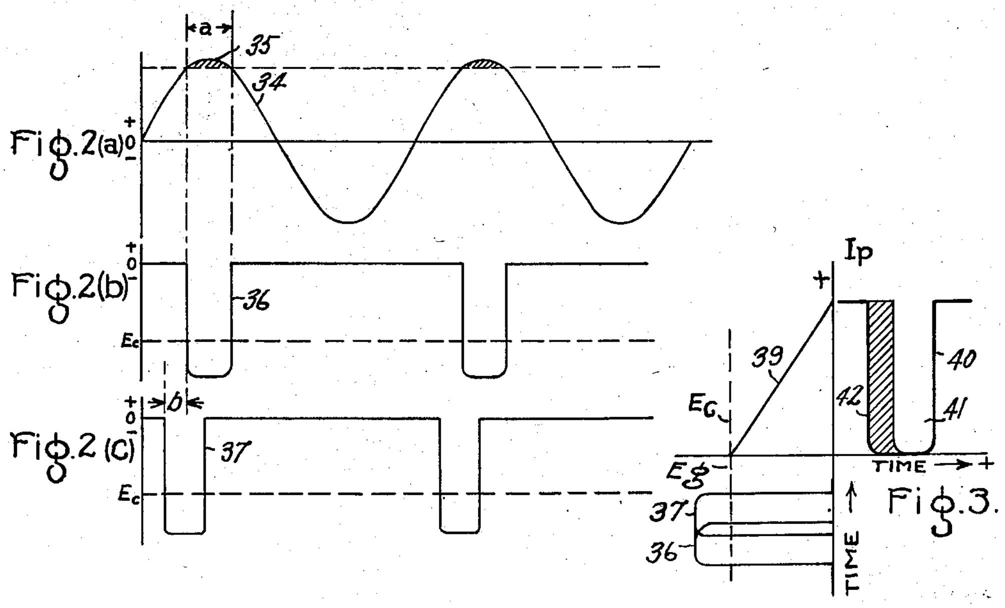

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawing wherein Fig. 1 is a schematic diagram, partly in block diagram form, of a television receiver embodying the principles of my invention; Figs. 2(a)-2(c) are timing diagrams of wave forms which are produced in the circuit of Fig. 1; and Fig. 3 is a characteristic curve illustrating the operation of my invention.

Referring now more particularly to the drawing, the system illustrated in Fig. 1 comprises a modulated carrier wave television receiver of the superheterodyne type including an antenna system 1 which is connected to a first detector and oscillator 2, to which are connected in cascade relation in the order named, an intermediate frequency amplifier 3, a second detector 4, a video amplifier 5 and a cathode ray tube viewing device 6. A vertical deflection circuit 7 is connected to the output of the second detector 4 through a synchronizing signal separator 8. The output of the synchronizing signal separator is also connected to a synchronized scanning oscillator circuit 9, to be described fully hereinafter, the output of the scanning oscillator being coupled to a horizontal scanning amplifier 10. The outputs of vertical deflection circuit 7 and horizontal scanning amplifier 10 are connected to their respective scanning coils 11, 12, which surround the neck of the cathode ray tube.

The units 1 through 8 inclusive and 10 may all be of conventional well known construction so that a detailed illustration thereof is unnecessary herein. Referring briefly, however, to the operation of the above described system as a whole, television signals intercepted by antenna circuit 1 are applied to oscillator-detector 2 wherein they are converted into intermediate frequency signals which are in turn selectively amplified in the intermediate frequency amplifier 3 and delivered to the second detector 4. The modulation components of the received signal are detected in second detector 4 and are applied to the video amplifier 5 wherein they are amplified and from which they are supplied in the usual manner to the control electrode of the cathode ray tube 6. The detected modulation components are also supplied to the synchronizing signal separator 8 wherein the vertical and horizontal synchronizing signals are separated, the vertical synchronizing signal being applied to the vertical deflection circuit 7. Scanning waves which are generated in the horizontal scanning oscillator circuit 9 are amplified in the horizontal amplifier 10 and applied to the scanning coils 12 of the cathode ray tube device. Likewise scanning waves from the vertical deflection circuit 7 are applied to the scanning coils 11 so as to produce electric scanning fields which deflect the electron beam of the cathode ray tube in two directions normal to each other so as to trace a rectilinear pattern on the screen and thereby to reconstruct the transmitted image.

Referring now more particularly to the portion of Fig. 1 embodying the present invention, synchronizing signals of negative polarity are connected from synchronizing signal separator 8 through a coupling capacitor 13 to the control electrode 14 of an electron discharge device 15. The cathode of device 15 is connected to ground and the anode 17 of device 15 is connected through a capacitor 18 to ground. A grid leak resistor 16 completes the control electrode path of device 15. An inductance 19 is connected across capacitor 18 and the ungrounded side of inductance 19 is connected through a capacitor 20 to the control electrode 21 of an electron discharge device 22. The cathode 23 of electron discharge device 22 is connected to a tap 24 on inductance 19. A grid leak resistor 25 completes the control electrode path of device 22. The anode 26 of device 22 is connected through a resistor 27 to the positive terminal of a unidirectional source of potential indicated by the battery 28. Anode 26 is also connected through a capacitor 29 and a resistor 30 to ground. Signals which are produced in the anode circuit of device 22 are coupled through a capacitor 31 to the horizontal scanning amplifier 10. A feed-back connection from the junction point of capacitor 29 and resistor 30 is made through lead 32 and resistor 33 to the control electrode of electron discharge device 15.

Considering now the operation of the above described oscillator system, it will be seen that capacitor 18 and inductance 19 form a resonant tank circuit in which sustained oscillations may be produced if sufficient energy is added by device 22 to compensate for the losses of the tank circuit. Device 22 is operated as a cathode tap Hartley oscillator in which the feed-back connection to sustain oscillations is produced by connecting the cathode of device 22 to a tap 24 on the tank circuit 18, 19. The capacitor 20 and resistor 25 provide a grid bias network which operates to hold device 22 in a state of nonconduction for the major portion of the oscillation cycle.

It will be appreciated that during the positive peaks of the sinusoidal voltage produced across tank circuit 18, 19 capacitor 20 assumes a charge of the polarity shown in the drawing due to the flow of grid current in device 22, which charge is sufficient to bias the control electrode 21 beyond anode current cut-off during the major portion of the oscillator cycle. Due to the fact that device 22 conducts for only a small portion of the oscillator cycle, the anode current thereof will be in the form of relatively narrow pulses. The pulses of oscillator anode current operate periodically to discharge capacitor 29 which has previously been charged from the potential 28 through resistors 27 and 30.

There is thus produced across capacitor 29 a saw-tooth voltage which is suitable for scanning the cathode ray tube. The scanning waveform is coupled through capacitor 31 to the horizontal scanning amplifier wherein it is suitably amplified so as to drive the horizontal scanning coils 12. During trace intervals, or in other words during the interval when capacitor 29 is being charged there is a positive voltage across resistor 30 due to the flow of charging current therethrough. However, when oscillator 22 conducts, the positive potential across resistor 30 disappears and therefore the voltage across resistor 30 is in the form of a train of negative going pulses. These pulses are fed back through resistor 33 to the control electrode of control tube 15.

Considering now the action of control tube 15 upon the tank circuit 18, 19, it will be apparent that device 15 will conduct during the positive half cycles of the sinusoidal voltage produced across tank circuit 18, 19 and during these positive half cycles of the sinusoidal oscillator voltage, device 15 will have a shunting effect across tank circuit 18, 19 which will be dependent upon the anode-cathode space path resistance of device 15.

If we consider the operation of the scanning oscillator during receipt of synchronizing pulses alone, and assuming that the amplitude of the negative going synchronizing pulses supplied to the control electrode of device 15 is sufficient completely to cut off device 15, it will be apparent that the shunting effect of device 15 is removed during occurrence of the synchronizing pulses. The synchronizing pulses thus have the effect of adding energy to the tank circuit by rendering the energy absorbing device 15 non-conductive during synchronizing pulses.

In visualizing the synchronizing action of device 15 it should be remembered that energy is oscillating back and forth in the tank circuit, being stored alternately in the capacitive branch and the inductive branch of the tank circuit. If the tank circuit has a low decrement, or high "Q," the ratio of energy stored within the tank circuit to energy dissipated therein during each cycle is large. The energy stored within the tank circuit will tend to oscillate at the natural frequency thereof in spite of extraneous disturbances and it is this inertia to change exhibited by the resonant tank circuit which is called the flywheel effect thereof.

Considering the control tube 15 as merely a resistance shunted across the tank circuit during a predetermined portion of each cycle of oscillation, it will be apparent that device 15 acts as a brake upon the flywheel action of the tank circuit and absorbs a portion of the energy stored in the tank circuit during periods when device 15 is conducting. The synchronizing pulses, however, render the energy absorbing device 15 non-conductive during the occurrence thereof and thus periodically remove the braking action of device 15 upon the tank circuit. The net effect of the synchronizing pulse is to add energy to the tank circuit by rendering the energy absorbing device 15 non-conductive at periodic intervals. If the free running frequency of the oscillator is not the same as the frequency of the synchronizing pulses, the synchronizing pulses must effectively supply the required reactive energy to cause the tank circuit to oscillate at the new frequency of the synchronizing pulses. However, due to the above described flywheel effect and the filtering action of the resonant tank circuit, only the fundamental frequency energy content of the synchronizing pulses is effective to lock the oscillator in step therewith. The resonant tank circuit exhibits a time constant effect comparable to the time constant obtained by integration in the phase detector type of synchronization systems so that substantial discrimination against noise impulses which may be present in the synchronizing signal is obtained. Locked oscillator circuits which operate from the synchronizing pulses alone rather than in combination with feedback pulses are described and claimed in my previously mentioned copending applications Serial No. 95,538, which was filed on May 26, 1949, and Serial No. 98,347, which was filed on June 10, 1949, and which are assigned to the same assignee as my present invention.

To increase the range of synchronization and to provide substantially greater noise rejection than is possible by using the synchronizing pulses alone, I provide in the present invention a feedback connection to the control electrode of device 15 so that negative pulses, which are derived from the oscillator, are added to the synchronizing pulses in the control electrode circuit of device 15. The amplitude of the negative oscillator feed-back pulses appearing at the control electrode of device 15 is preferably made sufficiently large so as completely to cut off device 15 during the occurrence thereof.

In considering the operation of the synchronizing circuit during receipt of synchronizing pulses and negative feed-back pulses from the oscillator, reference is now had to Figs. 2(*a*)–2(*c*) wherein the wave forms associated with the circuit are shown. In Fig. 2(*a*) there is illustrated the sinusoidal voltage 34 which is developed across tank circuit 18, 19 due to oscillation of energy therein. Due to the biasing effect of the grid time constant 20, 25, the anode current of device 22 flows only during the positive peaks 35 of the sinusoidal voltage 34, and the angle of conduction of device 22 indicated by the reference *a* is a small portion of the total oscillation cycle. The flow of anode current at the positive peaks 35 provides negative pulses across resistor 30 which are indicated in Fig. 2(*b*) as the negative going pulses 36. The negative pulses 36 are illustrated as being of greater amplitude than the cut-off potential $E_c$ of device 15.

Fig. 2(*c*) illustrates the negative synchronizing pulses 37 which are applied to the control electrode of device 15 from the preceding synchronizing signal separator 8. The anode current cut-off point of device 15 is indicated in Fig. 2(*c*) as the value $E_c$. It will be apparent from an inspection from Figs. 2(*b*) and 2(*c*) that the synchronizing pulses 37 are illustrated as leading the oscillator pulses 36 by a slight amount indicated in the drawing by the reference *b*.

To investigate further the behavior of the synchronizing circuit during receipt of synchronizing pulses and negative feed-back pulses, reference is now made to Fig. 3, wherein there is illustrated the grid voltage-anode current characteristic of control tube 15. The anode current $I_p$ of device 15 will vary in response to changes in control electrode voltage $E_g$, in accordance with the characteristic curve 39, it being apparent that the anode current cut-off point of device 15 is indicated by the dotted line $E_c$ in the drawing. A timing diagram of the synchronizing pulses 37 and the oscillator feed-back pulses 36 has been drawn along the ordinate of the characteristic curve graph, as shown in the lower portion of Fig. 3, the pulses being applied to the control electrode 14 of device 15 with sufficient amplitude to drive device 15 beyond cut-off.

The anode current $I_p$ which will flow in device 15 in response to the applied pulses 36, 37 is illustrated as a timing diagram continued along the abscissa of the characteristic curve 39 and is shown as the negative going pulse of anode current 40. The oscillator feed-back pulses 36 constitute the unshaded portion 41 of the total anode current pulse 40 and as they are derived from the oscillator the pulses 36 do not tend to change the frequency thereof. However, the shaded portion 42 of the plate current pulse 40 is proportional to the energy which is fed into the tank circuit of the oscillator by the synchronizing pulses 37 to maintain the oscillator in synchronism therewith. There thus exists a fixed phase shift between the synchronizing pulses and the oscillator feed-back pulses when the oscillator is running at the desired frequency of the synchronizing pulses, this phase shift being sufficient so that the portion of the synchronizing pulses indicated by the shaded area 42 adds the necessary reactive power to the tank circuit so as to cause the tank circuit to oscillate in synchronism with the synchronizing pulses.

If the frequency of the oscillator tends to be reduced, the oscillator feed-back pulses 36 will lag the synchronizing pulses 37 by a greater amount and, therefore, will produce a larger shaded area 42 in the composite pulse of anode current 40. Therefore, the energy fed to the tank circuit of the oscillator by the composite pulse 40 increases and the increase in energy added to the tank circuit increases the frequency of the oscillator so as to bring it back into synchronism with the synchronizing pulses. On the other hand, if the oscillator frequency tends to increase, the oscillator feed-back pulses 36 will lag the synchronizing pulse 37 by a less amount and, therefore, reduce the shaded area 42 of the composite anode current pulse 40 and thereby reduce the amount of energy fed into the tank circuit so that the frequency of the oscillator is decreased and synchronism with the synchronizing pulses is maintained. It will be understood that while we have considered the composite pulses 40 as being pulses of anode current, the pulses 40 are actually negative going, or, in other words, the anode current has a value of zero during the occurrence of the composite pulse 40. The composite pulse 40 thus has the effect of adding a variable amount of energy to the tank circuit by rendering the energy absorbing device 15 non-conductive during the occurrence of the composite pulse 40.

While I have indicated control tube 15 as being directly connected across the tank circuit 18, 19, it will be apparent that various other methods may be used to inject the phase responsive derived pulses 40 into the tank circuit. For example, the control tube 15 may be energized from a unidirectional supply voltage through a conventional anode load resistor, and capacitively coupled to the tank circuit, the only requirement being that the sinusoidal voltage established across the tank circuit be sufficient to render control tube 15 non-conductive during negative portions of the oscillator cycle. Such a modified control tube arrangement, for example, is described in connection with the synchronizing system claimed in my previously mentioned copending application Serial No. 98,347, filed on June 10, 1949, and assigned to the same assignee as my present invention. It will also be apparent that oscillator feed-back pulses suitable for comparison with the synchronizing pulses may be obtained from other points in the scanning oscillator circuit.

While the amplitude of the negative synchronizing pulses is preferably sufficient to bias the control tube 15 beyond cut-off, it is obvious that a synchronizing action will be obtained even though the control tube is not rendered completely non-conducting during the composite pulse 40, as a variable fundamental component of the derived synchronizing pulse 40 will still be injected into the tank circuit although the injected pulse will not be at as great an energy level.

The oscillator feed-back pulses have been illustrated as lagging the synchronizing pulses by a fixed phase angle $b$, that is, the free running frequency of the oscillator is illustrated as being somewhat lower than the frequency of the synchronizing pulses. However, it is obvious that a second stable point of operation may be obtained wherein the synchronizing pulses ride along the trailing edge of the oscillator feed-back pulses, in which case the oscillator will have a free running frequency which is higher than the frequency of the synchronizing pulses. In such a situation the variable reactive power added by the composite pulses 40 to the tank circuit 18, 19 will be of the opposite sign so as to vary the frequency of the tank circuit in the proper direction to maintain synchronism with the synchronizing pulses.

While my invention has been described by reference to a particular embodiment thereof, it will be understood that numerous modifications may be made by those skilled in the art without departure from my invention. I therefore aim in the appended claims to cover all such equivalent variations as come within the true spirit and scope of my invention.

What I claim as new and desire to secure by Letters Patent of the United States is:

1. In a television receiver provided with a resonant-circuit scanning oscillator having a predetermined natural frequency of oscillation and adapted to be synchronized with synchronizing signals consisting of periodically recurring pulses of short time duration compared to the recurrence interval thereof and subject to spurious pulses of a similar nature, means for deriving pulses from said oscillator which are of relatively short time duration compared to the recurrence interval thereof and having fixed phase relation to the cycles of its oscillations, means for combining said synchronizing pulses and said oscillator pulses to obtain a periodic pulse wave the fundamental frequency energy content of which varies in accordance with variations in the phase relation of said synchronizing pulses and said oscillator pulses, and means for impressing said periodic wave on said resonant circuit in polarity to vary the frequency of said oscillator, in accordance with the fundamental frequency energy content of said periodic wave, so as to oppose changes in said phase relation.

2. In an oscillator synchronizing system, the combination of a source of periodic synchronizing signals which may be contaminated by spurious and undesired impulses, an oscillator having a frequency-determining resonant circuit, said oscillator having a natural frequency of oscillation adapted to be synchronized with said signals, means for obtaining an output wave from said oscillator having fixed phase relation to its oscillations, means for combining said synchronizing signals and said output wave to produce a periodic wave the fundamental frequency energy content of which changes in accordance with changes in the phase relation of said synchronizing signals and said output wave, and means for applying the fundamental frequency energy of said periodic wave to said resonant circuit in a sense to maintain said oscillator in substantially fixed phase relation with respect to said synchronizing signals.

3. In an oscillator synchronizing system, the combination of a source of periodic synchronizing pulses which have a predetermined repetition frequency and which may be contaminated by spurious and undesired impulses, an oscillator having a frequency-determining resonant circuit, said oscillator being adapted to be synchronized to operate at said frequency, means for deriving periodic output pulses from said oscillator, means for substantially eliminating the deleterious effects of said spurious and undesired impulses while maintaining synchronism between said synchronizing pulses and said oscillator comprising an electron discharge device having a pair of control electrodes and a pair of output electrodes, means for applying both said synchronizing pulses and said output pulses between said input electrodes, and means for connecting said output electrodes across said resonant circuit.

4. In an oscillator synchronizing system, the combination of a source of negative synchronizing pulses which have a predetermined repetition frequency and which may be contaminated by spurious and undesired impulses, an oscillator having a frequency-determining resonant circuit, said oscillator having a free-running frequency of oscillation somewhat higher than said predetermined frequency, means for deriving negative output pulses from said oscillator having fixed phase relation to the cycles of its oscillations, and means for substantially eliminating the deleterious effects of said spurious and undesired impulses while maintaining synchronism between said synchronizing pulses and said oscillator comprising an electron discharge device having an input electrode circuit and an output electrode circuit, and means for applying both said synchronizing pulses and said output pulses to said input electrode circuit, each with sufficient amplitude to bias said device to cut-off, said output electrode circuit including said resonant circuit and being energized solely by oscillations produced across said resonant circuit.

5. In a television receiver, the combination of a source of periodic synchronizing pulses of one polarity and predetermined fundamental frequency, an oscillator having a frequency-determining resonant circuit, said oscillator having a free-running frequency of oscillation somewhat higher than said predetermined frequency, means for maintaining said oscillator in substantially fixed phase relation with respect to said synchronizing pulses comprising means for obtaining periodic pulses of said polarity from said oscillator, said output pulses having fixed phase relation to the cycles of its oscillations, means for combining said synchronizing pulses and said oscillator output pulses to obtain a resultant periodic wave comprising pulses whose durations vary in accordance with variations in the phase relation between said synchronizing pulses and said oscillator pulses, means including a normally-conductive electron discharge device for absorbing sufficient energy from said resonant circuit during a predetermined portion of the oscillator cycle to decrease the oscillator frequency below said predetermined frequency, and means for rendering said device nonconductive during each pulse of said resultant wave.

6. In an oscillator synchronizing system, the combination of a source of periodic synchronizing pulses of predetermined fundamental frequency, means comprising an oscillator having a frequency-determining resonant circuit for generating oscillations at nearly the same natural frequency, means for obtaining pulses from said oscillator having fixed phase relation to the cycles of said oscillations, means for combining said synchronizing pulses and said oscillator pulses to derive a resultant periodic wave comprising pulses whose durations vary in accordance with variations in the phase relation of said synchronizing pulses and said oscillator pulses, and means including an electron discharge device having an output circuit interconnected with said resonant circuit for injecting said derived periodic wave into said resonant circuit in a sense tending to maintain said oscillator in fixed phase relation with respect to said synchronizing pulses.

7. In a cathode ray scanning system adapted to be synchronized by a train of synchronizing pulses of predetermined fundamental frequency, a scanning oscillator having a frequency-determining resonant tank circuit, means for energizing said oscillator to generate oscillations at a free-running frequency somewhat higher than said predetermined frequency, damping means comprising a grid-controlled electron discharge amplifier having an anode-cathode path connected in circuit with said tank circuit, said amplifier tending to conduct on positive half-cycles of said oscillations and to load said tank circuit sufficiently to reduce the oscillator frequency below said predetermined frequency, means for deriving a train of feedback pulses from said oscillations, said feedback pulses occurring during consecutive positive half-cycles of said oscillations in substantially fixed phase relation thereto, and means for impressing both said trains of synchronizing pulses and feedback pulses on the grid of said amplifier in negative polarity so as to substantially increase the impedance of said path during both said trains of pulses and to reduce the loading effect of said amplifier.

8. In a cathode ray scanning system adapted to be synchronized by a train of negative synchronizing pulses of substantially constant widths and predetermined fundamental frequency, a scanning oscillator having a frequency-determining resonant tank circuit, means energizing said oscillator to generate oscillations at a free-running frequency somewhat higher than said predetermined frequency, damping means comprising an electron discharge amplifier having an anode, cathode and control grid, said anode and cathode being connected to spaced points on said tank circuit so located that said amplifier tends to conduct in response to positive half-cycles of said oscillations and to load said tank circuit sufficiently to reduce the oscillator frequency below said predetermined frequency, means for deriving a train of negative feedback pulses from said oscillations, said feedback pulses having substantially constant widths and occurring during the peaks of consecutive positive half-cycles of said oscillations, and means for impressing both said trains of synchronizing pulses and feedback pulses between said control grid and cathode, each said train having sufficient amplitude to drive said amplifier substantially to cut-off during the pulses thereof.

WOLF J. GRUEN.

REFERENCES CITED

The following references are of record in the file of this patent:

UNITED STATES PATENTS

| Number | Name | Date |
|---|---|---|
| 2,141,343 | Campbell | Dec. 7, 1938 |
| 2,344,810 | Fredendall | Mar. 21, 1944 |
| 2,351,759 | Grundmann | June 20, 1944 |
| 2,399,431 | Artzt | Apr. 30, 1946 |